(12) United States Patent
Burns et al.

(10) Patent No.: US 6,275,496 B1
(45) Date of Patent: Aug. 14, 2001

(54) CONTENT PROVIDER FOR PULL BASED INTELLIGENT CACHING SYSTEM

(75) Inventors: Gregory Burns, Carnation; Paul J. Leach, Seattle, both of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/260,933

(22) Filed: Mar. 2, 1999

Related U.S. Application Data

(62) Division of application No. 08/703,487, filed on Aug. 26, 1996, now Pat. No. 5,991,306.

(51) Int. Cl.[7] .................................................. H04L 12/56
(52) U.S. Cl. ........................................... 370/429; 709/217
(58) Field of Search ..................................... 370/252, 401, 370/310, 338, 428, 429, 412; 455/5.1; 348/7, 12; 709/217, 218, 219, 201, 202, 203

(56) References Cited

U.S. PATENT DOCUMENTS

| 5,732,078 | 3/1998 | Arango | 370/355 |
| 5,768,513 | 6/1998 | Kuthyar et al. | 395/200 |
| 5,790,935 | * 8/1998 | Payton | 455/5.1 |

* cited by examiner

Primary Examiner—Huy D. Vu
(74) Attorney, Agent, or Firm—Lee & Hayes, PLLC

(57) ABSTRACT

A network system includes a content provider connected to local service providers via an interactive distribution network, such as the Internet. The local service providers facilitate delivery of the content from the content provider to multiple subscribers. The local service providers schedule delivery of frequently requested content from the content provider prior to a peak time when the subscribers are likely to request the content. The content is downloaded from the content provider during the off-peak hours and cached at the local service providers for serving to the subscribers during the ensuing peak time. In this manner, the frequently requested content is already present at the local service providers and ready to be served to the subscribers before they actually request it. When the content is finally requested, the data is streamed continuously in real-time for just-in-time rendering at the subscriber computer. Another aspect of this invention involves supplementing content delivery over the Internet with delivery of content over a secondary network, such as a broadcast satellite network. The supplemental broadcast link offers additional bandwidth at a fraction of the cost that would be incurred if the local service provider installed additional Internet connections, such as T1 or T3 connections.

2 Claims, 6 Drawing Sheets

CONTENT PROVIDER FOR PULL BASED INTELLIGENT CACHING SYSTEM

RELATED APPLICATIONS

This is a divisional of U.S. patent application Ser. No. 08/703,487, filed Aug. 26, 1996, which is now U.S. Pat. No. 5,991,306.

TECHNICAL FIELD

This invention relates to network systems, and particularly public network systems, such as the Internet. More particularly, this invention relates to methods which improve distribution of streaming continuous data (e.g., audio and video data) from a content provider over a network to a subscriber's computer or other content rendering unit.

BACKGROUND OF THE INVENTION

Public networks, and most notably the Internet, are emerging as a primary conduit for communications, entertainment, and business services. The Internet is a network formed by the cooperative interconnection of computing networks, including local and wide area networks. It interconnects computers from around the world with existing and even incompatible technologies by employing common protocols that smoothly integrate the individual and diverse components.

The Internet has recently been popularized by the overwhelming and rapid success of the World Wide Web (WWW or Web). The Web is a graphical user interface to the Internet that facilitates interaction between users and the Internet. The Web links together various topics in a complex, non-sequential web of associations which permit a user to browse from one topic to another, regardless of the presented order of topics. A "Web browser" is an application which executes on the user's computer to navigate the Web. The Web browser allows a user to retrieve and render hypermedia content from the WWW, including text, sound, images, video, and other data.

One problem facing the continued growth and acceptance of the Internet concerns dissemination of streaming continuous data, such as video and audio content. Data is delivered and rendered to users in essentially two formats. The first format, referred to as "block data," entails downloading the entire data set to local storage and then rendering the data from the locally stored copy. A second delivery format, known as "streaming data," entails sending bits of data continuously over the network for just-in-time rendering.

Computer network users have been conditioned through their experiences with television and CD-ROM multimedia applications to expect instantaneous streaming data on demand. For technical reasons, however, the Internet is often unable to deliver streaming data. This inability is most pronounced for video data. In the Internet context, there is often long delays between the time video content is requested and the time when the video content actually begins playing. It is not uncommon to wait several minutes for a video file to begin playing. In essence, for factors discussed below, video data is traditionally delivered as "block data" over the Internet and thus requires that the entire file be downloaded prior to rendering.

The inability to provide streaming data is a result of too little bandwidth in the distribution network. "Bandwidth" is the amount of data that can be moved through a particular network segment at any one time. The Internet is a conglomerate of different technologies with different associated bandwidths. Distribution over the Internet is usually constrained by the segment with the lowest available bandwidth.

FIG. 1 shows a model of a public network system 20, such as the Internet. The network system 20 includes a content server 22 (e.g., a Web server) which stores and serves multimedia data over a distribution network 24. The network system 20 also has regional independent service providers (ISPs) or point of presence (POP) operators, as represented by ISP 26, which provide the connectivity to the primary distribution network 24. Many users, as represented by subscriber computers 28, 30, and 32, are connected to the ISP 26 to gain access to the Internet.

The ISP 26 is connected to the distribution network 24 with a network connection 34. In this example illustration, the network connection 34 is a "T1" connection. "T1" is a unit of bandwidth having a base throughput speed of approximately 1.5 Mbps (Megabits per second). Another common high bandwidth connection is a T3 connection, which has a base throughput speed of approximately 44.7 Mbps. For purposes of explaining the state of the technology and the practical problems with providing real-time streaming data over the Internet, it is sufficient to understand that there is also a limited bandwidth connection between the content server 22 and the distribution network 24.

The subscriber computers 28, 30, and 32 are connected to their host ISP 26 via home entry lines, such as telephone or cable lines, and compatible modems. As examples of commercially available technology, subscriber computer 28 is connected to ISP 26 over a 14.4K connection 36 which consists of a standard telephone line and a V.32bis modem to enable a maximum data rate of 14.4 Kbps (Kilobits per second). Subscriber computer 30 is connected to the ISP 26 with a 28.8K connection 38 (telephone line and V.34 modem) which supports a data rate of 28.8 Kbps. Subscriber computer 32 is connected to the ISP 26 with an ISDN connection 40 which is a special type of telephone line that facilitates data flow in the range of 128–132 Kbps. Table 1 summarizes connection technologies that are available today.

TABLE 1

Connection Technologies and Throughput

| Connection Type | Base Speed (Kbps) |
| --- | --- |
| V.32bis modem | 14.4 |
| V.34 modem | 28.8 |
| 56K Leased Line | 56 |
| ISDN BRI (1 channel) | 56–64 |
| ISDN BRI (2 channels) | 128–132 |
| Frame Relay | 56–1,544 |
| Fractional T1 | 256–1,280 |
| ISDN PRI | 1,544 |
| Full T1 (24 channels) | 1,544 |
| ADSL | 2,000–6,000 |
| Cable Modem | 27,000 |
| T3 | 44,736 |

With a T1 connection to the primary distribution network 24, the ISP 26 can facilitate a maximum data flow of approximately 1.5 Mbps. This bandwidth is available to serve all of the subscribers of the ISP. When subscriber computer 28 is connected and downloading data files, it requires a 14.4 Kbps slice of the 1.5 Mbps bandwidth. Subscriber computers 30 and 32 consume 28.8 Kbps and 128 Kbps slices, respectively, of the available bandwidth.

The ISP can accommodate simultaneous requests from a number of subscribers. As more subscribers utilize the ISP services, however, there is less available bandwidth to satisfy the subscribers requests. If too many requests are received, the ISP becomes overburdened and may not be able to adequately service the requests in a timely manner, causing frustration to the subscribers. If latency problems persist, the ISP can purchase more bandwidth by adding additional capacity (e.g., upgrading to a T3 connection or adding more T1 connections). Unfortunately, adding more bandwidth may not be economically wise for the ISP. The load placed on the ISP typically fluctuates throughout different times of the day. Adding expensive bandwidth to more readily service short duration high-demand times may not be profitable if the present capacity adequately services the subscriber traffic during most of the day.

The latency problems are perhaps the most pronounced when working with video. There are few things more frustrating to a user than trying to download video over the Internet. The problem is that video requires large bandwidth in comparison to text files, graphics, and pictures. Additionally, unlike still images or text files, video is presented as moving images which are played continuously without interruption. Video typically requires a 1.2 Mbps for real-time streaming data. This 1.2 Mbps throughput requirement consumes nearly all of a T1 bandwidth (1.5 Mbps). Accordingly, when multiple subscribers are coupled to the ISP and one subscriber requests a video file, there is generally not enough capacity to stream the video in real-time from the content server 22 over the Internet to the requesting subscriber. Instead, the video file is typically delivered in its entirety and only then played on the subscriber computer. Unfortunately, even downloading video files in the block data format is often inconvenient and usually requires an excessive amount of time.

Consider the following example. Suppose a subscriber wishes to access the CNN Web site on the Internet for an account of recent news. As part of the news materials, CNN provides a twenty second video clip of an airplane hijacking incident. At 1.2 Mbps, the 20 second video clip involves downloading a 24 Mbyte file over the Internet. If the user has a modest 14.4 Kbps connection, it would take approximately 28 minutes to download the entire file.

Now, assume that the subscriber/ISP connection is sufficiently large to handle real-time video streaming of the video file, meaning that the subscriber computer can render the video data as it is received from the ISP. Despite the bandwidth of the subscriber/ISP connection, real-time video streaming may still be unachievable if the T1 connection 34 between the ISP 26 and the distribution network 24 is unable, or unwilling due to policy reasons, to dedicate 1.2 Mbps of its bandwidth to the video file. Requests for the CNN video clip made during peak traffic times at the ISP most certainly could not be accommodated by the ISP/network connection. Since adding more bandwidth may be a poor investment for the ISP, the ISP may have no economic incentive to remedy the latency problem. The result is that some users might be inconvenienced by the lack of ability to receive streaming video despite their own connection to the ISP being capable of accommodating streaming video.

The latency problem is further aggravated if the connection between the content server 22 and the distribution network 24 is equally taxed. The lack of sufficient bandwidth at the content server/network link could also prevent real-time video streaming over the Internet, regardless of the bandwidths of the network/ISP link or the ISP/subscriber link. If all links lack sufficient bandwidth, the latency problem can be compounded.

One solution to this problem is to provide local cache storage at the ISP. As subscribers request files from the Internet, the ISP caches the files locally so that subsequent requests are handled in a more expeditious manner. This process is known as "on-demand caching." Local on-demand caching methods improve the ability to deliver video content over the Internet. When the first subscriber requests the CNN video clip of the airplane hijacking incident, the ISP requests the video clip from the CNN server, and facilitates delivery of the video clip to the requesting subscriber. The ISP also caches the video clip in its own memory. When any subsequent subscriber requests the same CNN video clip, the ISP serves the local version of the video clip from its own cache, rather than requesting the clip from the CNN server. If the subscriber computer has a high bandwidth connection with the ISP, the locally stored video clip can be served as continuous streaming video data for instantaneous rendering on the subscriber computer.

A drawback of the on-demand caching method is that the first requesting subscriber is faced with the same latency problems described above. All subsequent subscribers have the benefit of the cached version. However, if the initial delay is too long, there may not be any subscriber who is willing to assume the responsibility of ordering the video file and then waiting for it to download.

Accordingly, there remains a need to develop improved techniques for facilitating distribution of streaming video over public networks, such as the Internet.

SUMMARY OF THE INVENTION

This invention provides improved methods for delivering large amounts of data, such as streaming audio and video data, over a network, such as the Internet. According to one aspect, the method involves an intelligent, pre-caching and pre-loading of frequently requested content to the local service provider (e.g., ISP or LAN network server) prior to peak demand times when the content is likely to be requested by the subscribers. In this manner, the frequently requested content is already downloaded and ready to be served to the subscribers before they actually request it. When the content is finally requested, the data is streamed continuously in real-time for just-in-time rendering at the subscriber. This eliminates the latency problems of prior art systems because the subscribers do not have to wait for the downloading of video and audio files over the Internet. Moreover, intelligently pre-caching content before peak demand times is more effective than traditional on-demand caching because the content is available to the first subscriber who requests it.

In one implementation, the network system includes a content provider connected to local service providers via a distribution network. The local service providers facilitate delivery of the content from the content provider to multiple subscribers. The local service providers are configured to request certain content from the content provider prior to a peak time when the subscribers are likely to request the content. The content is downloaded from the content provider during non-peak hours and cached at the local service providers for serving to the subscribers during the ensuing peak time.

The local service provider includes a processing control unit, a cache memory, and a continuous media server. A hit recording module executes on the processing control unit to record requests for particular content from the subscribers. In the Internet context these requests are submitted in the form of URLs (universal resource locators) for target resources located on the Web. A pattern recognizer detects behavior patterns based on subscriber requests to determine which content the subscribers are most likely to request and when. A scheduler then schedules requests for the frequently requested content from the content provider at a selected time prior to the peak demand time for that content. These requests are posted to the content provider at their scheduled times, and the content provider downloads the content during the off-hours prior to the peak time.

When the content is received from the content provider, the local service provider stores the content in the cache memory. For instance, the content might be a Web page from a frequently visited Web site. Web pages are typically designed as hypermedia documents to provide rich multimedia presentations which blend text, images, sound, and video. If the Web page references or includes continuous data files, such as audio or video files, these files are stored in a continuous media server. The target specifications embedded in the Web page to reference the continuous data files are modified to reference the local copy of the continuous data files, as opposed to the original location of the files at the Web site.

During the ensuing peak time, the processing control unit serves the target resources maintained in the cache memory to the subscribers. If any subscriber clicks on or otherwise activates a link to an audio or video file, the requested file is served as a continuous stream of data from the continuous media server at the ISP. In this manner, the continuous video or audio data stream can be rendered just-in-time by the subscriber.

Another aspect of this invention involves supplementing the primary Internet connection owned by the ISP with a delivery of content over a secondary network. This supplemental delivery effectively increases bandwidth between the content provider and the local service provider. In the described implementation, the content provider broadcasts additional content over a broadcast satellite network to the local service provider. The broadcast communication link offers additional bandwidth at a fraction of the cost that would be incurred if the local service provider installed additional Internet connections, such as T1 or T3 connections. The broadcasted content is stored at the local service provider and served during peak times to afford continuous audio streaming to the subscribers.

BRIEF DESCRIPTION OF THE DRAWINGS

The same reference numbers are used throughout the figures to reference like components and features.

DETAILED DESCRIPTION OF THE PREFERRED EMBODIMENT

Figure 1:
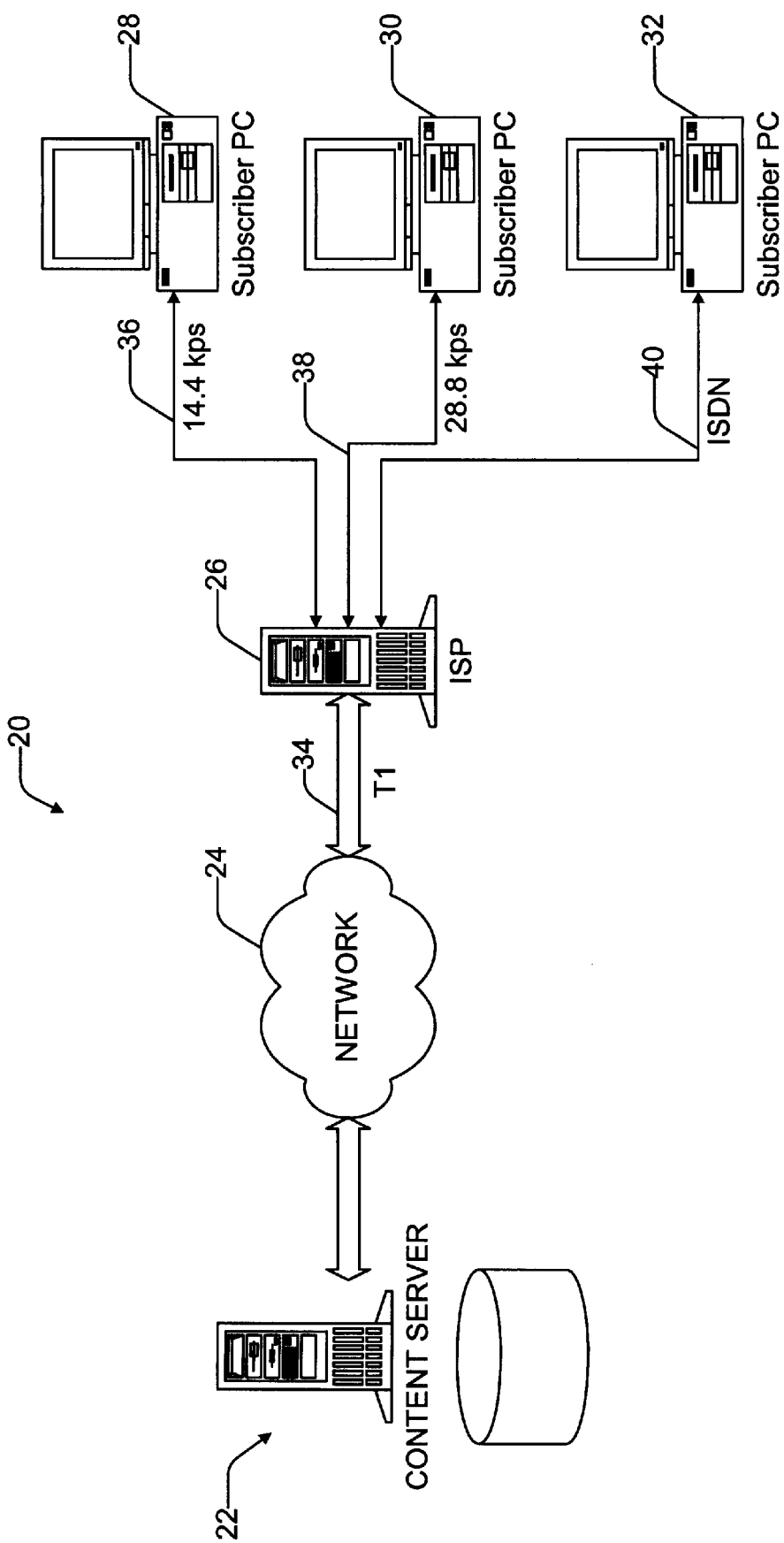
FIG. 1 is a diagrammatic illustration of a network system which is used to explain the present state of Internet technology.
Figure 2:
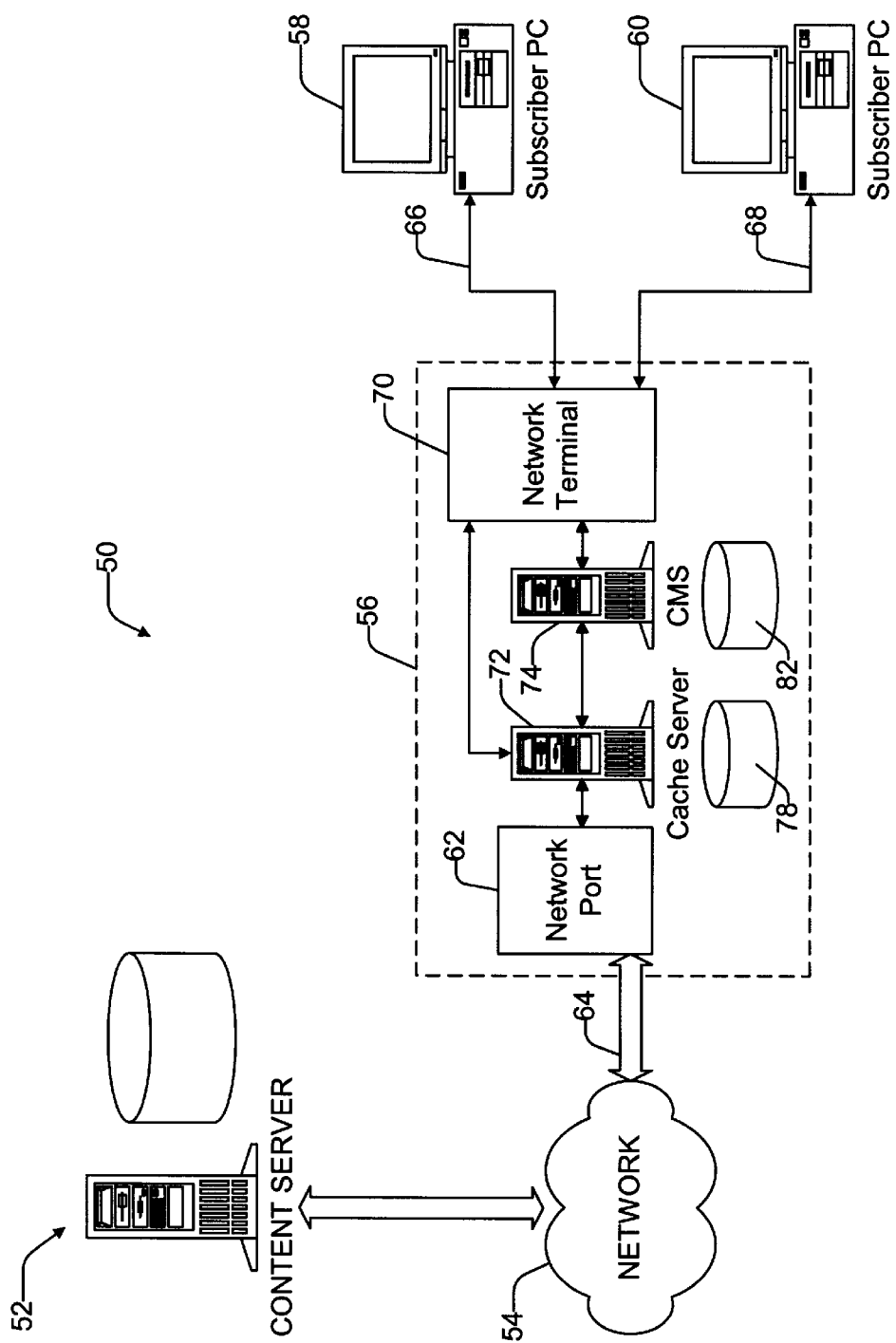
FIG. 2 is a diagrammatic illustration of a network system constructed according to one implementation of this invention.

FIG. 2 shows a public network system 50. It includes multiple content servers, as represented by content server 52, which store and serve content over a network 54. The content server 52 serves content in the form of text, audio, video, graphic images, and other multimedia data. In the Internet context, the content servers might represent Web sites which serve or multicast content in the form of hypernmedia documents (e.g., Web page) which link text, images, sounds, and actions in a web of associations that permit a user to browse through related topics, regardless of the presented order of the topics. The content server 52 might alternatively represent headend servers for a cable company which transmit video content over a cable network, or an audio server for a radio station that sends audio data over the network. The content server 52 might further represent servers for educational institutions, public agencies, libraries, merchants, or any other public or private organizations which serve or multicast information over the network.

The network 54 is a high-speed, high-bandwidth interactive distribution network and can be representative of the Internet. Traffic over the network 54 is organized according to protocols which define how and when data is moved. One example protocol is the transmission control protocol/Internet protocol (TCP/IP) which forms the backbone of the Internet. The network 54 might be implemented using various physical mediums, including wirebased technologies (e.g., cable, telephone lines, etc.) and wireless technologies (e.g., satellite, cellular, infrared, etc.). The network is operated according to high-speed switching services, including connection-oriented network services (e.g., frame relay, asynchronous transfer mode (ATM), etc.) and connectionless services (e.g., switched multimegabit data service, etc.). These switching services support connection speeds of several Megabits per second (Mbps), up to Gigabits per second (Gbps). At these speeds, the network 54 is capable of supporting streaming video data which requires 1.2 Mbps.

Many independent service providers (ISPs), as represented by ISP 56, function as terminal connections or "on-ramps" to the high-speed network 54. The ISP 56 acts as an intermediary between the subscribers 58 and 60 and the network 54. The ISP 56 has a network port 62 which provides a high-speed, high-bandwidth connection 64 to the network 54. The ISPs segment and rent portions of the bandwidth to the multiple subscribers 58 and 60 so that the subscribers do not individually need to purchase and maintain their own network connections. The ISPs 56 may also be referred to as point of presence (POP) servers, and the names "ISP" and "POP" are used interchangeably in this disclosure.

The subscriber personal computers (PCs) 58 and 60 are individually connected to the ISP 56 by permanent or sessional dial-up connections. Conventional telephone or cable lines and compatible modems are used to form the connections 66, 68. Examples of suitable technologies include HFC, ISDN, POTS, and ADSL. The ISP 56 has network terminal switching equipment 70 to accommodate the connections to the subscriber PCs 58, 60.

The ISP 56 also has a cache server 72 and a continuous media server (CMS) 74. The cache server 72 is configured as a conventional database server having processing capabilities, including a CPU (not shown), and storage 78. As one example, the cache server 72 is implemented as a SQL (Structure Query Language) database. The cache server 72 caches Internet resources, such as those requested by subscriber computers 58, 60, that have been downloaded from the content provider 52 to allow localized serving of those resources.

The CMS 74 is a server designed particularly for serving continuous data streams, such as video data and audio data, in an ordered and uninterrupted manner. As one example implementation, the continuous media server is configured as a disk array data storage system consisting of many large capacity storage disks with video and audio data streams stored digitally thereon. The locations of the video and audio data streams are kept in a memory map and each video and audio data stream is accessed through pointers to the particular memory location. To serve the audio or video data, the processor grabs the pointer to the video stream and begins retrieving the video from the storage disk 82 and streaming it over the communication line 66, 68 to the requesting subscriber computing unit.

Figure 3:
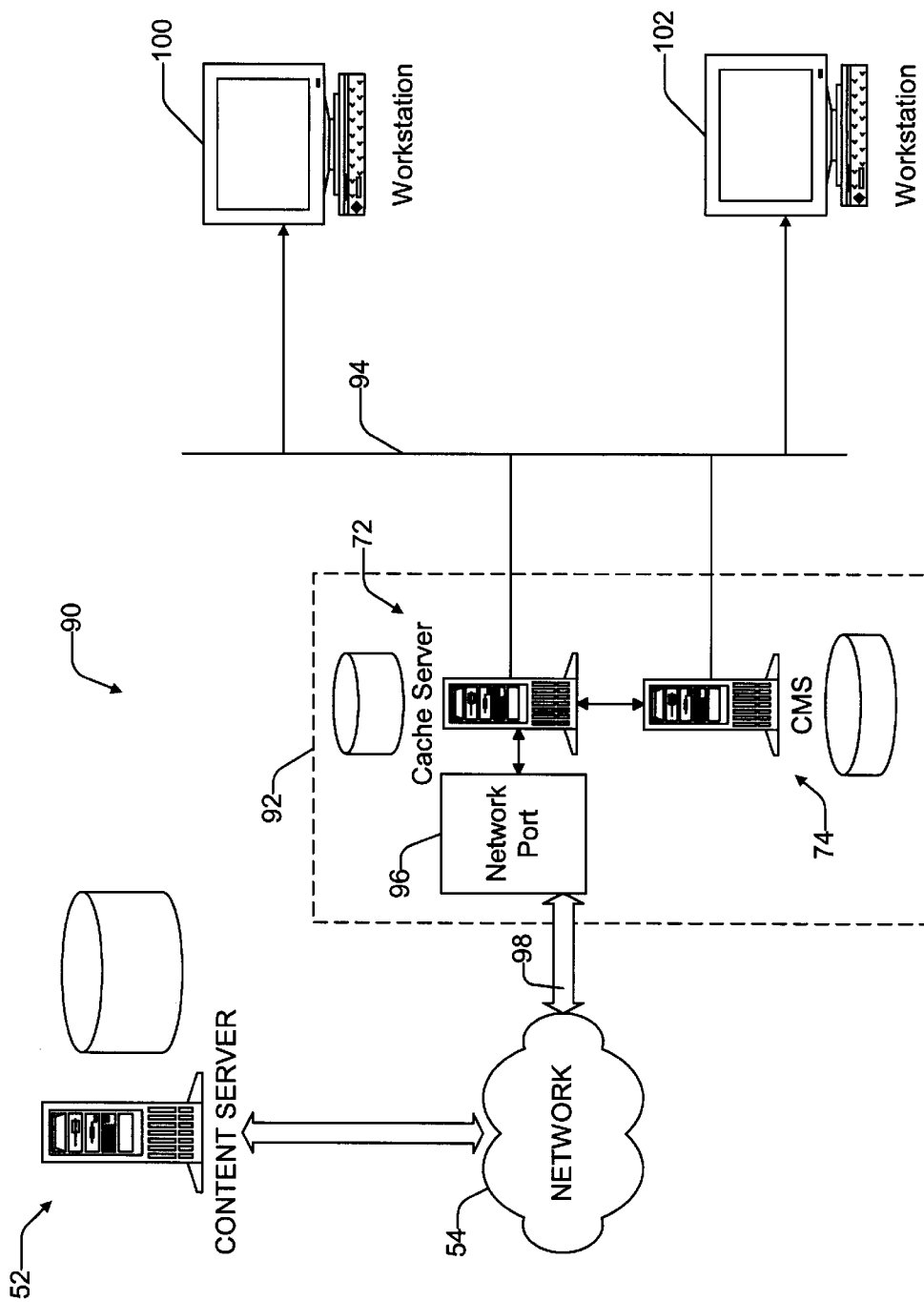
FIG. 3 is a diagrammatic illustration of a network system constructed according to another implementation of this invention.

FIG. 3 shows a network system 90 which is implemented in a local area network (LAN) configuration. This implementation is exemplary of how a company or multi-user organization might be connected to the Internet. The network system 90 differs from the system of FIG. 2 in that the local service provider which facilitates the on-ramp connection to the high-speed, high-bandwidth network 54 is itself a local server 92 on a LAN 94. The LAN 94 can be constructed using conventional network topologies, such as Ethernet. The LAN network server 92 has a network port 96 which enables a high-speed, high-bandwidth connection 98 to the network 54. The cache server 72 and CMS 74 are connected to the LAN 94. Workstations or other computing units 100, 102 are connected to the LAN 94 and are served by the LAN network server 92 in regards to Internet access. In this configuration, the LAN users of workstations 100, 102 have access to the Internet through their enterprise LAN 94 and the LAN network server 92.

It is noted that both implementations of FIGS. 2 and 3 are shown and described as suitable examples for implementing various aspects of the invention. However, the network system might be implemented in a variety of arrangements. In addition, the illustrations show the subscriber units as being personal computers or work stations. However, the subscriber units can be implemented in other forms which are capable of rendering content received over the network. As examples, the subscriber computing units might include televisions, computers, game devices, handheld devices, and the like.

As explained in the Background section, conventional techniques for delivering video and audio content over the Internet is plagued with latency problems. An aspect of this invention is to provide an improved method for delivering streaming audio and video content over a network system. The technique involves an intelligent, pre-caching and pre-loading of certain content at the local service provider (e.g., ISP, POP, LAN network server) prior to optimal or peak demand times when the content is likely to be requested by the subscribers. In this manner, the frequently requested content is already downloaded and ready for access from the subscribers before they actually request it. When it is finally requested, the data can be streamed continuously in real-time for just-in-time rendering from the local service provider to the subscriber. This eliminates the latency problems of prior art systems. Moreover, intelligently pre-caching content before peak demand times is more -effective than traditional on-demand caching because the content is available to the first subscriber who requests it.

Figure 4:
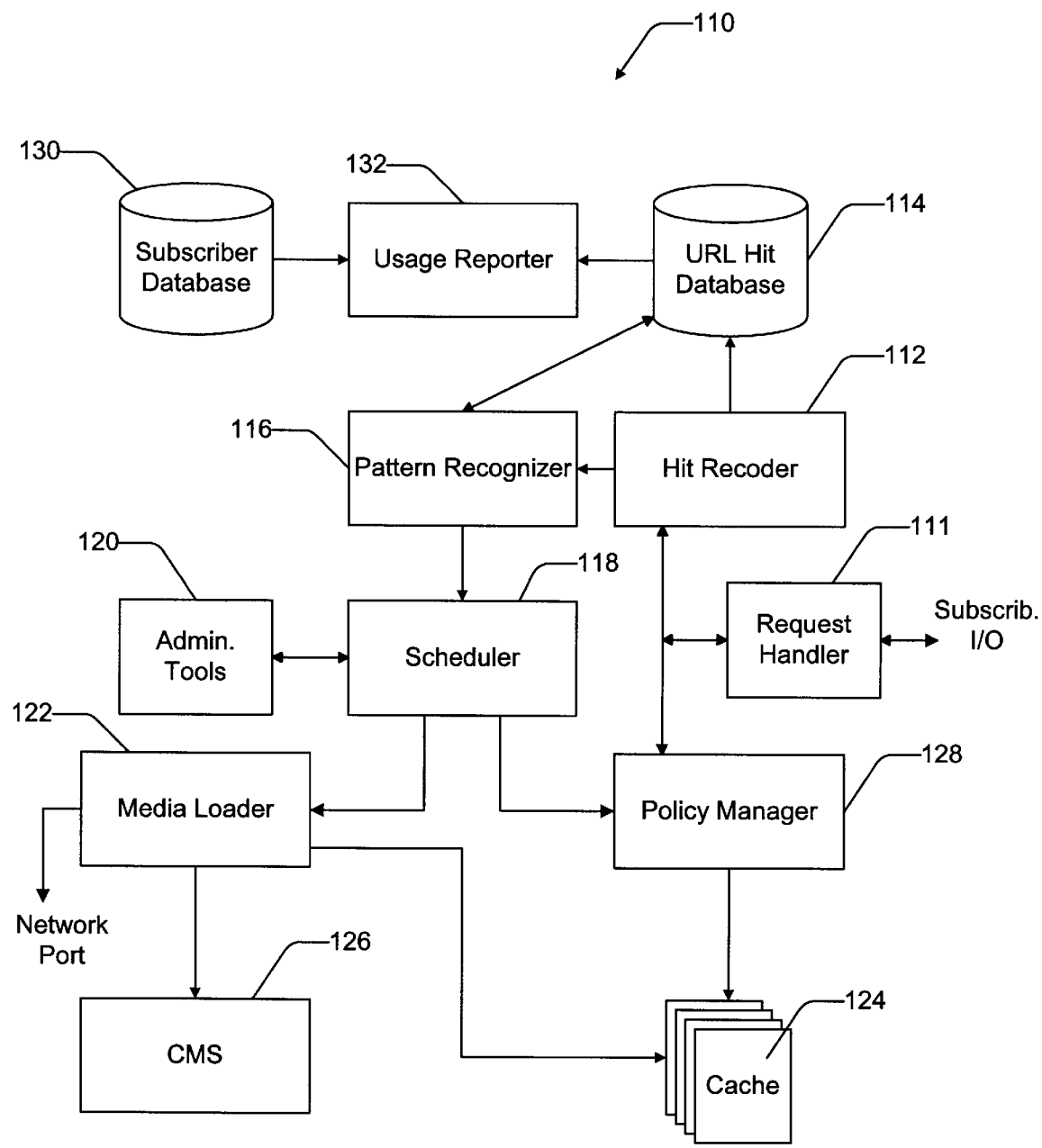
FIG. 4 is a block diagram of the functional components in a local service provider in the network system.

FIG. 4 shows a functional block diagram of a local service provider 110 according to one implementation which enables intelligent pre-caching and pre-loading. At its most fundamental level, the local service provider 110 provides an on-ramp connection to the Internet for its subscribers. The subscribers send requests to the local service provider 110 for content available on the Internet. The local service provider acts as an intermediary facilitator which communicates the requests to the appropriate content server and then returns the requested content to the appropriate subscribers.

The local service provider 110 has a request handler 111 which manages requests received from the subscribers. In the Web context, the subscriber computers run Web browser applications which generate requests in the form of universal resource locators (URLs). A URL describes everything about a particular resource that a Web browser needs to know to request and render it. The URL describes the protocol a browser should use to retrieve the resource, the name of the computer it is on, and the path and file name of the resource. The following is an example of a URL:

http://www.microsoft.com/upgrades The "http://" portion of the URL describes the protocol. The letters "http" stand for HyperText Transfer Protocol, the set of rules that a browser will follow to request a document and the remote server will follow to supply the document. The "www.microsoft.com" portion of the URL is the name of the remote host computer which maintains the document. The last portion "/upgrades" is the path and file name of the document on the remote host computer.

When the request handler 111 receives a request, the local service provider 110 first looks to its own cache memory 124 to determine if a proxy copy of the target resource referenced by the URL is stored locally. The cache memory 124 serves as a quasi-temporary local storage for holding proxy copies of often used and requested target resources. The cache memory 124 can be implemented using different types of memory, including RAM, storage disks (optical, magnetic, etc.), and the like. If a proxy copy is stored in the cache memory 124, the target resource is served locally from the cache memory 124. If there is no proxy copy, the local service provider 110 uses the URL request to locate the target resource from a content provider and to request delivery of the target resource over the Internet. The local service provider 110 passes the target resources on to the requesting subscriber and may also cache the target resource in the cache 124 if the policy rules governing the cache are met.

The local service provider 110 has a hit recorder 112 which is coupled to receive the URLs submitted by the subscribers. For each URL, the hit recorder 112 records hit information in a URL hit database 114. The hit information includes the date/time of the request, the subscriber who made the request, and other information. The hit recorder 112 also triggers a pattern recognizer 116 which draws on information in the URL hit database 114 to detect repetitive access behavior patterns based on subscriber requests. The pattern recognizer 116 performs statistical analyses using hit data from the URL hit database to determine usage patterns that help the local service provider be more responsive to the needs of its clientele. For instance, in the preferred implementation, the pattern recognizer 116 determines which-URLs, and hence which Internet resources, are being requested most often and least often, and the time of day when the most requests are received. The pattern recognizer 116 is also responsive to operator input to allow adjustment or tuning by the operator for specialized analysis.

A scheduler 118 uses the pattern results generated by the pattern recognizer 116 to schedule requests for specific URLs of target resources on the Internet. The requests are scheduled to be filled at pre-selected times prior to the peak times when the highest number of users are most likely to request the content found at the URLs. Administrative tools 120 permit the operator to configure various operating parameters.

The pattern recognizer 116 and scheduler 118 cooperate to enable intelligent pre-caching of frequently requested content. The operation of the local service provider 110 to perform this intelligent pre-cacing according to an aspect of this invention is described in conjunction with reference to the flow diagram of FIG. 5. The local service provider is programmed to perform the computer-implemented steps of FIG. 5 to alleviate the problems of providing streaming video and audio data over the Internet. The steps are presented in the illustrated order for discussion purposes, but are not restricted to this sequence.

Figure 5:
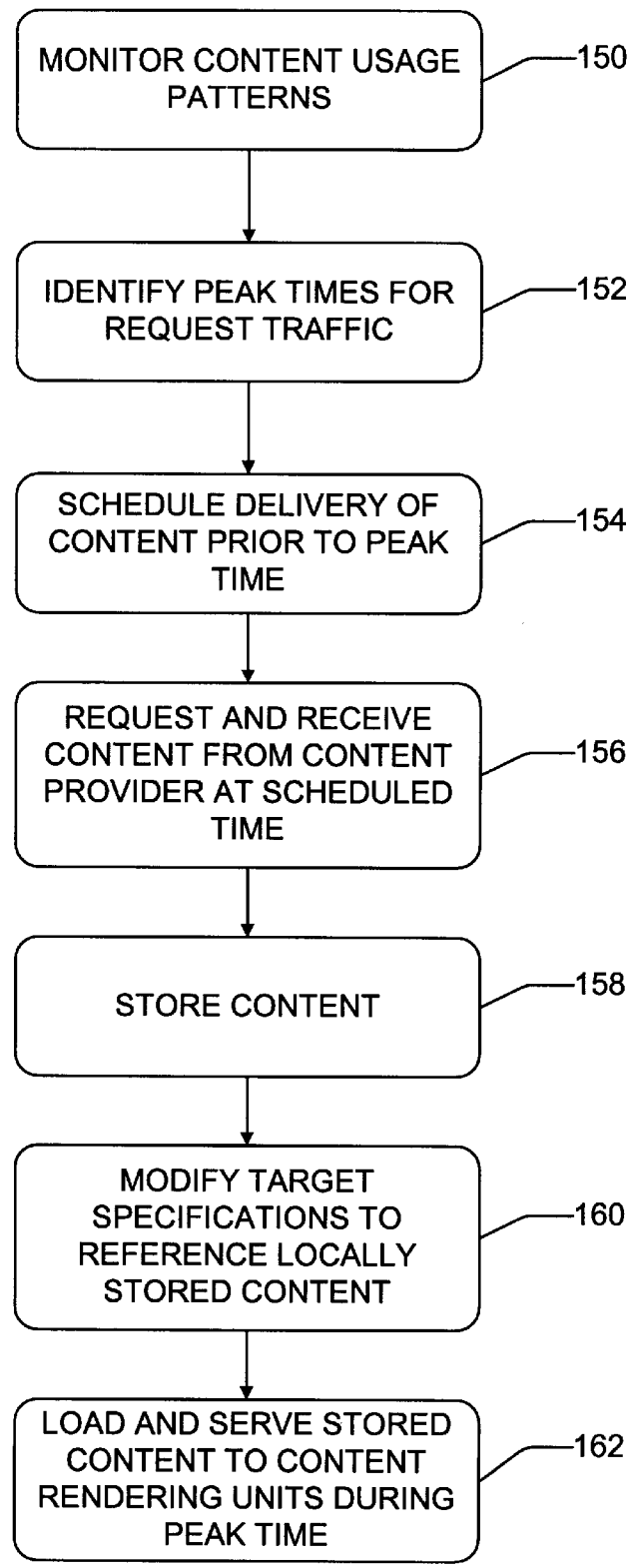
FIG. 5 is a flow diagram of a method for operating the local service provider.

The pattern recognizer 116 monitors the patterns of the subscriber requests to determine which content is most frequently requested and when (step 150 in FIG. 5). From these patterns, the pattern recognizer 116 can identify peak times in subscriber traffic and the relation of the peak times to specific requested content (step 152). For instance, suppose that a high number of subscribers frequently request the CNN Web page during the morning hours of 6:30 AM to 8:00 AM. These requests translate into a high number of URL hits for the CNN Web page which are recorded by hit recorder 112 in the URL hit database 114. The pattern recognizer 116 recognizes this recurring pattern of requests for the CNN Web page and identifies the peak time for this Web page to be between 6:30 AM and 8:00 AM.

Using the patterns identified by the pattern recognizer 116, the scheduler 118 schedules delivery of the content at a selected time prior to the peak time (step 154 in FIG. 5). In this example, the scheduler 118 might schedule delivery of the CNN Web page at a time prior to 6:30 AM. For instance, the scheduler 118 might schedule a request for the CNN Web page at 6:00 AM to provide sufficient time to download that page before the earliest subscribers are expected to begin asking for it, yet not too early to ensure that the latest news is included.

At the scheduled time, a media loader 122 sends a request to the content server on the Internet and receives the content from that content server (step 156 in FIG. 5). The content is stored locally at the local service provider (step 158). More particularly, the data comprising the target resource is stored as a proxy file in the cache memory 124, and any continuous data content (e.g., audio or video data) is stored in the continuous media server 126. In the Web context, the content might be in the form of a Web page or other hypermedia document that has hyperlinks to various data items, such as audio and/or video clips. The hypermedia document itself is stored in the cache memory 124, while the audio and video clips referenced by the hyperlinks are stored in the CMS 126. The target specifications corresponding to the links in the cached hypermedia document are modified to reference the audio and video files in the CMS 126, as opposed to the files maintained at the Web site (step 160 in FIG. 5). As an alternative to modifying the target specifications, a conversion table can be constructed which converts requests from referencing the files at the Web site to referencing the files in the CMS 126.

In our CNN example, the local service provider 110 sends a request to the CNN Web site seeking to download the CNN Web page at 6:00 AM. The CNN Web page is downloaded over the Internet and stored in the cache memory 124. If the CNN Web page contains links to any audio or video clips of recent news, these data files are also downloaded and stored in the CMS 126. The links within the cached Web page are modified to reference the audio and video files stored locally in the CMS 126, instead of the files maintained at the CNN Web site.

The media loader 122 loads the locally stored content just before the peak time so that it is ready to serve during the peak time (step 162 in FIG. 5). When the first subscriber requests the CNN Web page at, for example, 6:40 AM, the local service provider 110 serves the Web page from the cached memory 124. If the subscriber activates a link to a video or audio file, the local service provider 110 immediately serves the data stream from the CMS 126 for just-in-time rendering on the subscriber's computer. Accordingly, the video file is served as streaming data to even the first subscriber who requests it, rather than making that subscriber wait for the file to be retrieved over the Internet.

The intelligent pre-caching method obviates the latency problems associated with streaming video and audio over the Internet, and is a further improvement to traditional on-demand caching techniques. However, it is noted that the network system does not accommodate data streaming for every video and audio file on the Internet, but instead only selected files. The system makes an intelligent choice as to which content is likely to be requested by its subscribers and then makes only this content readily available to the subscribers. In this way, the method seeks to optimize the physical computing resources of the local service provider in a manner which best services the majority of the clientele.

It is noted that the content servers serve many local service providers over the Internet. These local service providers, in turn, serve many different users. Due to varying demographics, the local service providers will generally differ in the content that it most often serves to its clientele. For example, a service provider in Seattle, Wash., might have many requests for content on entertainment or news local to Seattle. The pattern recognizer for a Seattle-based service provider might therefore schedule proportionally more Seattle related content than, say, a London-based service provider. As a result, the sets of pre-cached content may differ significantly from one service provider to another depending upon the results of the local hit recorder and pattern recognizer.

The system and method described above places the authority for deciding which content is pre-cached at the local service provider. This allows the local service provider to adapt to the often changing patterns of its clientele. However, in another implementation, the content servers can be given the governing authority of deciding when and what content to download to the ISPs prior to peak times. For instance, the content server can maintain a schedule of when to download different sets of content to various ISPs in timely fashion before the sets of content are requested by the respective users who are serviced by the ISPs.

With continuing reference to FIG. 4, in this implementation, the local service provider 110 also includes a policy manager 128 which defines and administers rules that determine which documents or resources are cached in the cache memory 124. For instance, caching rules might call for caching resources that are routinely requested by many subscribers, but foregoing caching resources that are rarely or infrequently requested. The policy rules also coordinate cache maintenance by deciding when documents are out-of-date and how these documents are deleted from the cache memory 124.

According to another aspect of this invention, time-to-live (TTL) tags are assigned to the content to assist in determining when the content should be refreshed or disposed. The TTL tags can be assigned by the content server as part of the content itself. The server can attach an expiration tag which represents the publisher's best estimate as to how long it will be before the content is updated.

Alternatively, the local service providers might compute the TTL tags for the content it caches in cache memory 124.

The computation is based upon a theory that older content is less likely to change. Content that changed only 10 minutes ago is statistically more likely to change within the next 24 hours than content that last changed one month ago. In one implementation, an approximate TTL is computed as a percentage of time since the content is known to have last changed. The percentage is an operator controlled parameter. Suppose a 10% value is selected. Content that last changed 72 hours ago is assigned a TTL tag of 7.2 hours. If the content is not updated within 7.2 hours, it is given a new value of 7.9 hours (i.e., (72 hours+7.2hours)×10%=7.9 hours). As the content ages, it is checked less often. The TTL tags can be kept in a separate table of the cache 124 to correlate the tags and their content.

Deletion policies are a function of the content itself (e.g., its TTL tags), the subscriber patterns (e.g., how frequently the content is requested), the cost to request newer updated content, and the constraints imposed by capacity limitations of the cache memory.

The local service provider 110 also maintains a subscriber database 130 which stores lists of subscribers (or LAN users in the LAN configuration) and pertinent information about them (e.g., routing addresses, billing addresses, etc.). A usage reporter 132 uses the URL hit information from the URL hit database 114 and subscriber information from the subscriber database 130 to generate reports on subscriber usage patterns. These reports can be used by the operator to efficiently allocate computer resources to best satisfy the needs of its clientele. The reports can also be used by content providers to help them assess the popularity of their Web sites and the type of subscribers who visit them.

In a preferred implementation, the functional components described with respect to FIG. 4 are implemented in software which executes on the host computer of the local service provider. It is noted that the functional layout is provided for explanation purposes. The subscriber database 130, the URL hit database 114, and the cache memory 124 can be implemented as one database server. Other implementation variations may also be made.

In the above system, the local service providers (e.g., ISPs, LAN Web servers) initiate the requests for content so that it may be pre-cached prior to peak demand times when the content is most likely to be requested. This system can be referred to as a "pull-caching" system in that content is pulled over the Internet upon request of the local service providers. The method of intelligently pull-caching data prior to peak times enables delivery of streaming video and audio data to Internet users.

Figure 6:
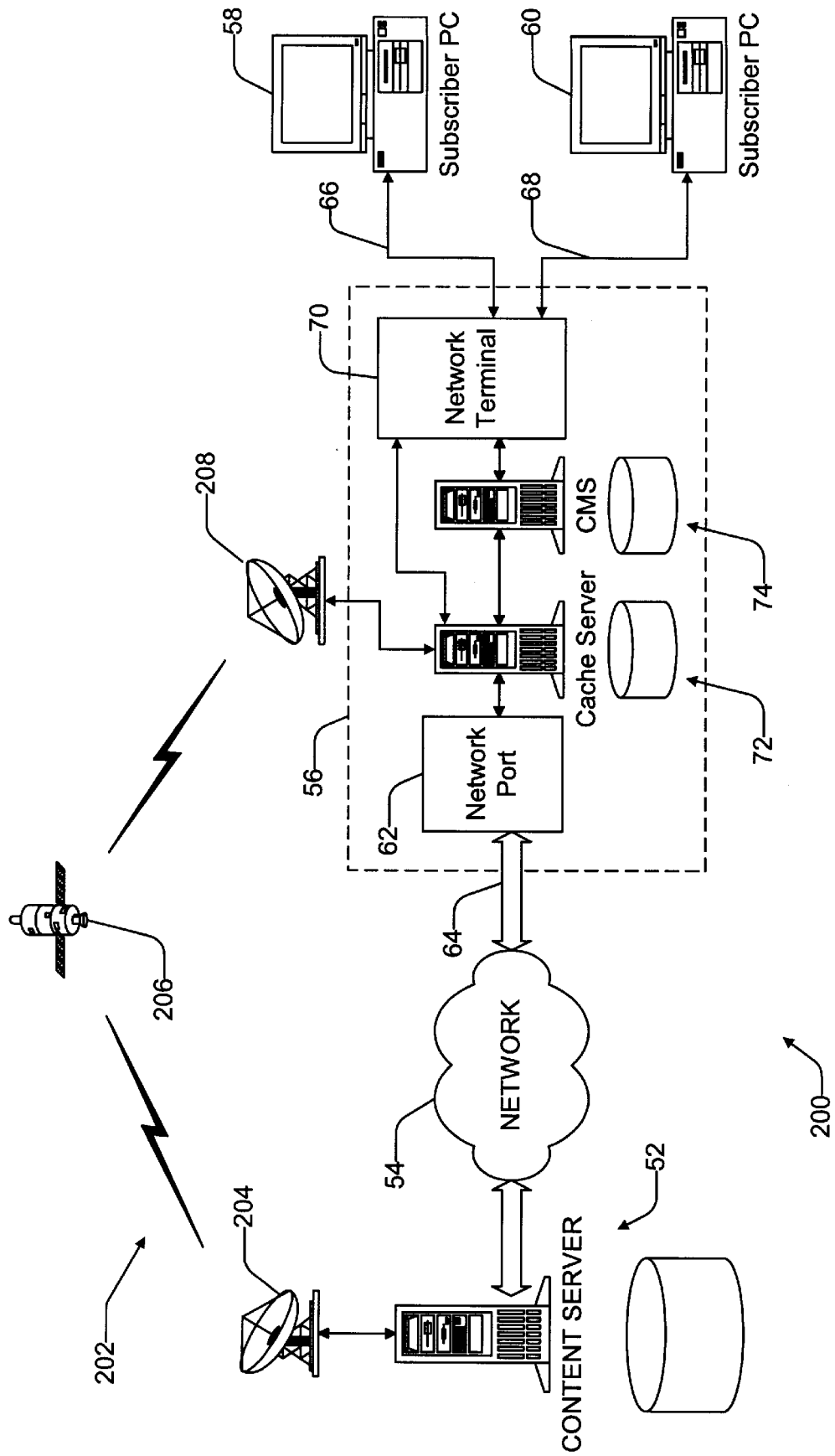
FIG. 6 is a diagrammatic illustration of a network system according to still another implementation of this invention.

FIG. 6 shows a network system 200 according to another aspect of this invention. The network system 200 attacks the latency problem of streaming video and audio data by supplementing the primary Internet distribution network with a second network which is not reliant on the Internet/ISP connection. The Internet/IISP connection is often the bottleneck for streaming data and is typically the connection least likely to be upgraded due to economic factors surrounding the business of the ISP. Although not required, in this implementation, the content may be pushed top down from the content provider over the Internet and thus, the system may be referred to as a "push-caching" system.

Network system 200 is similar to the configuration of the FIG. 2 network system 50 in that it has a content server 52 which serves content over a high-speed, high-bandwidth network 54, via local ISPs 56, to end users 58 and 60. The difference between the two systems is that network system 200 of FIG. 6 has an additional, secondary network 202 for distributing content from the content server 52 to the ISPs 56. In the illustrated implementation, the secondary network 202 is a broadcast satellite network. The content provider 52 has a transmitter 204 which sends signals to an orbiting satellite 206, which redirects the signals to an ISP-based receiver 208.

The secondary satellite network 202 affords a supplemental bandwidth for delivery of content to participating ISPs in addition to the content delivered over the interactive network connection 62. For instance, using present DSS (digital satellite service) technology, the satellite network 202 provides an additional 6 Mbps bandwidth to deliver content to the ISP 56. This extra bandwidth is made available at a fraction of the cost of buying T1/T3 connections.

The supplemental-caching technique allows the content provider to download more information in a timely manner. To continue the above CNN example, the CNN content provider might transmit the CNN Web page over the satellite system 202 minutes before the peak time of 6:30 AM to 8:00 AM. The ISP receives the Web page from its satellite receiver 208 and caches the Web page for serving during the peak time. The CNN Web page is thereby efficiently made available for real-time streaming to the subscribers, without tying up or consuming any of the bandwidth provided by the network connection 62.

In a preferred implementation, the supplemental satellite network 202 is uni-directional, in that data is broadcast from the content provider 52 to the ISP 56. It is a low cost solution increasing the bandwidth of the pipeline to the ISP, without requiring significant investment on the part of the ISP. In addition to satellite technologies, the broadcast network 202 can be implemented as other wireless systems, such as RF or cellular technologies.

In another embodiment, the secondary network 202 can be implemented as an second data communications network whereby supplemental content is multicasted to participating ISPs prior to the peak time.

In compliance with the patent statutes, the invention has been described in language more or less specific as to structure and method features. It is to be understood, however, that the invention is not limited to the specific features described, since the means herein disclosed comprise exemplary forms of putting the invention into effect. The invention is, therefore, claimed in any of its forms or modifications within the proper scope of the appended claims appropriately interpreted in accordance with the doctrine of equivalents and other applicable judicial doctrines.

What is claimed is:

1. A content provider, comprising:

a storage system to store content;

a server connected to the storage system to serve the content to requesting clients; and the server being programmed to serve early at least some of the content to the clients prior to a peak time when the clients are likely to request the content, and the server being programmed to assign a time-to-live tag to the content to indicate when the content is expected to be updated.

2. A content provider as recited in claim 1, wherein the server serves multiple clients, the server being programmed to serve early different sets of content for different ones of the clients.

* * * * *

UNITED STATES PATENT AND TRADEMARK OFFICE
CERTIFICATE OF CORRECTION

PATENT NO.    : 6,275,496 B1
DATED         : August 14, 2001
INVENTOR(S)   : Burns et al.

It is certified that error appears in the above-identified patent and that said Letters Patent is hereby corrected as shown below:

Column 6,
Line 6, change "nmedia" to -- media --.

Column 7,
Line 58, change "-effective" to -- effective --.

Column 8,
Line 55, change "which-URLs" to -- which URLs --.

Column 11,
Line 54, change "Internet/IISP" to -- Internet/ISP --.

Signed and Sealed this

Twelfth Day of March, 2002

Attest:

JAMES E. ROGAN
Attesting Officer    Director of the United States Patent and Trademark Office